US006613431B1

(12) United States Patent
Rumiesz et al.

(10) Patent No.: US 6,613,431 B1
(45) Date of Patent: Sep. 2, 2003

(54) MICRO DENIER FIBER FILL INSULATION

(75) Inventors: Joseph Rumiesz, Vooheesville, NY (US); Victor P. Laskorski, N. Attleborough, MA (US)

(73) Assignee: Albany International Corp., Albany, NY (US)

( * ) Notice: Subject to any disclaimer, the term of this patent is extended or adjusted under 35 U.S.C. 154(b) by 0 days.

(21) Appl. No.: 10/081,786

(22) Filed: Feb. 22, 2002

(51) Int. Cl.[7] ................................................ B32B 19/00
(52) U.S. Cl. ....................................................... 428/357
(58) Field of Search ................................ 428/357, 402, 428/362, 371

(56) References Cited

U.S. PATENT DOCUMENTS 2,923,980 A 2/1960 Steinruck
3,892,909 A 7/1975 Miller ........................ 428/371
4,065,599 A 12/1977 Nishiumi et al. ........... 428/402
4,164,534 A 8/1979 Ogino ........................ 264/117
4,418,103 A 11/1983 Tani et al. ..................... 428/4
4,524,492 A 6/1985 Elliott ......................... 19/107
4,555,421 A 11/1985 Yasue ............................ 428/6
4,588,635 A 5/1986 Donovan .................... 428/288
4,618,531 A 10/1986 Marcus ....................... 428/283
4,783,364 A 11/1988 Ilan ............................ 428/288
4,820,574 A 4/1989 Tesch ......................... 428/234
4,992,326 A 2/1991 Dabi .......................... 428/283
5,043,207 A 8/1991 Donovan et al. ........... 428/226
5,218,740 A 6/1993 Snyder et al. .............. 19/66 R
5,344,707 A 9/1994 Snyder ....................... 428/359
5,851,665 A 12/1998 Marcus ....................... 428/357
6,329,051 B1 12/2001 Groh et al. ................. 428/360
6,329,052 B1 12/2001 Groh et al.

*Primary Examiner*—N. Edwards
(74) *Attorney, Agent, or Firm*—Frommer Lawrence & Haug, LLP; Ronald R. Santucci

(57) ABSTRACT

An insulation or filling material composed of fiber balls which are made up of a random entanglement of micro denier polyester fibers.

8 Claims, 4 Drawing Sheets

40

MICRO DENIER FIBER FILL INSULATION

FIELD OF THE INVENTION

The present invention is directed towards improvements in fiber fill material which is commonly referred to as fiber balls.

BACKGROUND OF THE INVENTION

There have been many attempts to create an insulation or fill material which is an acceptable substitute for down. Polyester fiber fill is one of them and has achieved wide spread commercial acceptance as fill material for pillows, bedding, apparel and furnishings, among other things. Such fill may take on various forms such as staple fibers of various sizes, hollow and solid fibers, and crimped fibers, among others. Various shapes have also been suggested such as spheres (U.S. Pat. No. 4,065,599), spheres with projecting fibers to allow for interlocking (U.S. Pat. No. 4,820,574), crimped bundles of fibers (U.S. Pat. No. 4,418,103), assemblies of looped fibers (U.S. Pat. No. 4,555,421), rolls of fibers, bails, bundles and pin cushion configurations (U.S. Pat. No. 3,892,909), just to mention a few. In addition, clusters of fibers formed from shredded batt, such as that disclosed in U.S. Pat. No. 6,329,051 entitled "Blowable Insulation Clusters", and such clusters in an admixture with natural fibers such as down, as disclosed in U.S. Pat. No. 6,329,052 entitled "Blowable Insulation", have been found particularly suitable as insulation/fill material. What has also been shown to provide an excellent insulation fill material in the form of batt or clusters is a mixture of macrofibers and microfibers as disclosed in U.S. Pat. No. 4,992,326 entitled "Synthetic Down". Further, the compositions of insulation/fill material disclosed in U.S. Pat. Nos. 4,588,635 and 5,043,207, have also been found well suited as substitute for natural insulation.

Various ways of creating fiber fill or fiber balls have been suggested in the aforesaid patents. Others ways include that disclosed in U.S. Pat. No. 5,851,665 which describes point bonding of tows of fibers. Another way, as disclosed in U.S. Pat. No. 5,218,740 is to feed a uniform layer of staple fiber into a rotating cylinder covered with card clothing and rolling the fiber into rounded clusters which are removed by a special doffer screen. Others suggest blowing or air tumbling the fiber into a ball. (See e.g. U.S. Pat. Nos. 4,618,531; 4,783,364; and 4,164,534.)

It has been suggested that there is a distinction between fiber balls and nubs (sometimes referred to as neps). (See e.g. U.S. Pat. No. 5,344,707.) The term nub typically refers to a small limp knot or speck in yarn or fabric or a snarl or tangle mass of fibers (Fairchild's Dictionary of Textiles 1970 Edition). Nubs, it is stated, are typically produced on cards and contain a substantial amount of fibers with a strongly entangled nucleus that does not contribute to resiliency. Nubs, it is further said, do not have the bulk, resilience and durability required for filling applications (as distinct from fiber balls).

It is interesting to note that nubs during web or batt production are undesirable and attempts were made to avoid the occurrence of nubs during carding. (See e.g. U.S. Pat. No. 4,524,492.) As noted in U.S. Pat. No. 2,923,980 the production of nubs was a fortuitous event, since it occurred on a carding machine where the cylinder coating had deteriorated to the point that they could no longer produce the desired web or batt free from small nubs. Realizing the utility of nubs, machines for purposely creating them (typically by way a of modified carding machine) were developed, such as that disclosed in the immediately aforesaid patent.

SUMMARY OF THE INVENTION

It is the principal object of the invention to provide for a fiber ball that has good physical integrity whilst being resilient and durable.

It is a further object of the invention to create a fiber ball that provides for good insulation while being soft to the touch.

A yet further object of the invention is to provide for a means of creating such fiber balls that does not involve expensive and complicated modifications to existing machinery.

A still further object of the invention is to provide such fiber balls in an admixture with other material, which can be either natural or synthetic.

These and other objects and advantages are provided by the present invention. In this regard the present invention envisions the use of a standard carding machine having certain modifications to create fiber balls made from micro denier polyester fibers. Such modifications do not necessitate the structural changing of the machine elements. Rather, it basically involves reversing the direction of rotation of some of its elements and their clothing. What occurs during production is that the fibers are physically rolled and entangled into balls. This provides for superior integrity, resiliency and durability. In addition, it has been found that the use of micro denier polyester fibers results in warmer, softer insulation or filling. It is also envisioned that the fiber balls so formed may be mixed with natural or synthetic fibers to suit a particular application.

BRIEF DESCRIPTION OF THE DRAWINGS

Thus by the present invention its objects and advantages will be realized, the description of which should be taken in conjunction with the drawings, wherein.

DETAILED DESCRIPTION OF THE PREFERRED EMBODIMENT

Figure 1:
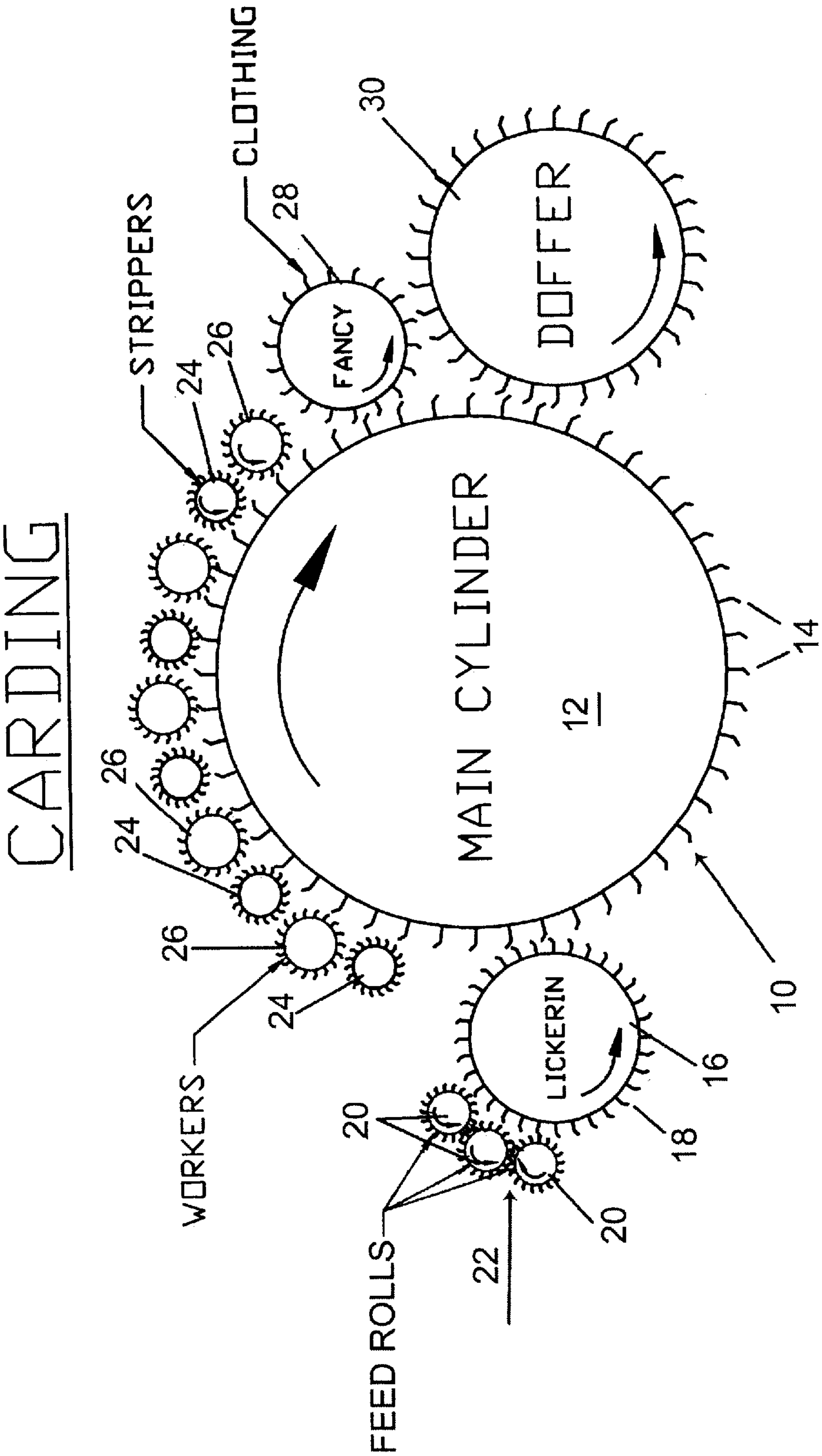
FIG. 1 illustrates in a somewhat schematic fashion, a typical carding machine.
Figure 2:
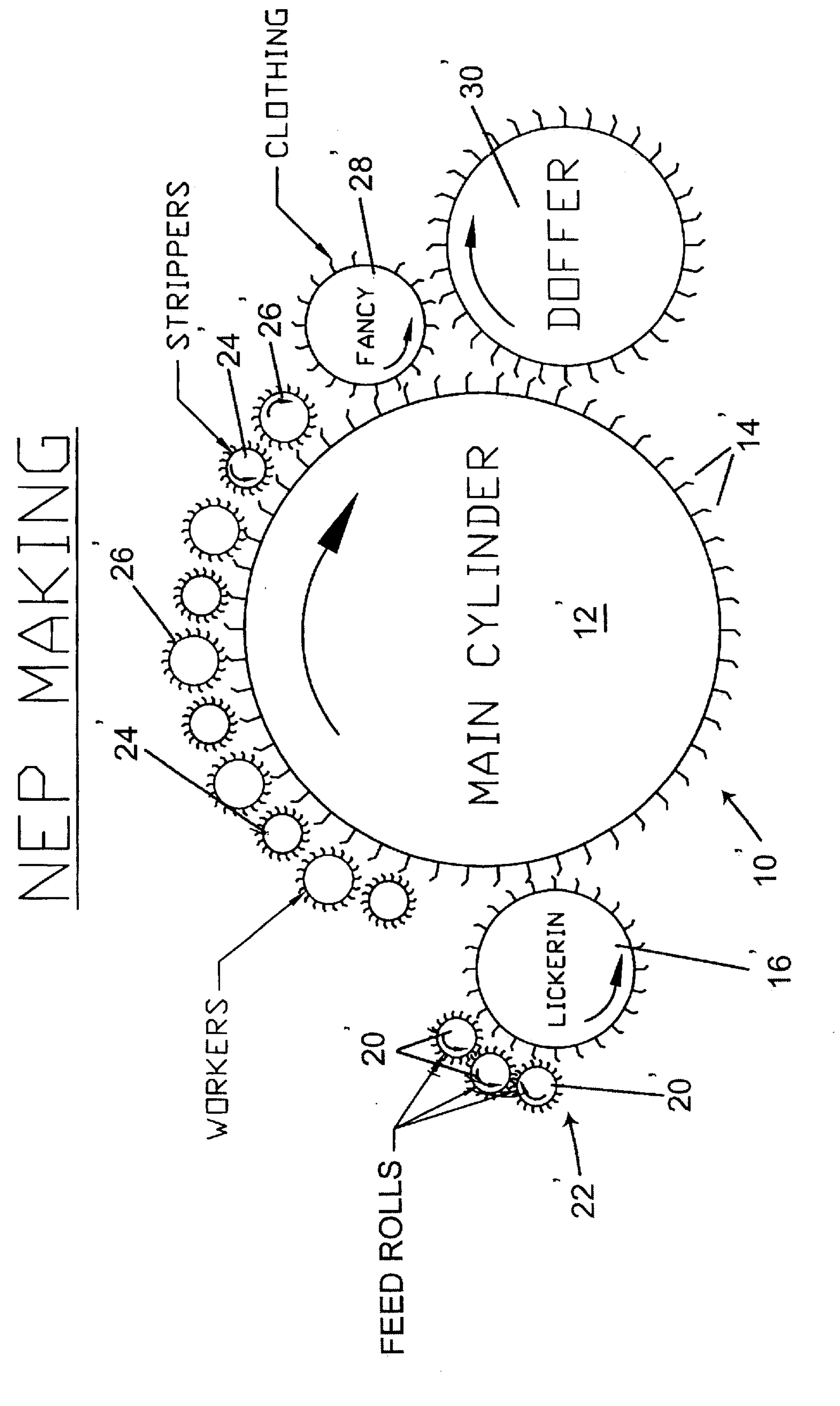
FIG. 2 illustrates in a somewhat schematic fashion, a carding machine which has been modified to create fiber balls, incorporating the teachings of the present invention.

Turning now more particularly to the drawings, in FIG. 1 there is shown a typical carding apparatus 10. The operation of carding machines is generally discussed in U.S. Pat. No. 5,218,740, the disclosure of which is incorporated herein by reference. In general, carding is involved in taking a mass of fibers, blending them, removing impurities, orientating them and creating a web which is then subject to further processing. An undesirable aspect of carding are nubs for which steps and improvements have been taken to avoid them.

The carding apparatus 10 typically includes a main cylinder 12 on which is located card clothing 14. This typically rotates in a clockwise direction. Positioned upstream thereof is a smaller roll 16, commonly called a lickerin, also covered with clothing 18 which rotates in the opposite direction to that of cylinder 12. Adjacent roll 16 is a plurality of feed rolls 20, two of which rotate counter clockwise, one of which rotates clockwise.

The feed rolls 20 feed the open fiber 22 onto the roller 16 which is picked up by its clothing 18 and, in turn, fed onto the main cylinder 12. About a portion of the circumference of main cylinder 12 is a plurality of pairs of worker rolls 24 and stripper rolls 26. The rotation of the worker/stripper rolls is typically opposite to that of the main cylinder 12 for carding. The tips (or clothing orientation) 28 on the worker rolls 24 point towards the feed end (i.e. to the left of FIG. 1) while the tips 30 on the stripper rolls 26 and the tips 32 of the main cylinder 12 point toward the doffer end (i.e. to the right). The carding effect occurs between the worker rolls 26 and the main cylinder 12. The clothing on the stripper rolls 24 strips the fibers from the worker rolls 26 and carries them to be removed therefrom by the main cylinder 12. A fancy roll 28 is provided to give loft to the web being formed, which is then lifted off by a doffer roll 30.

The foregoing describes a typical carding operation. Such an operation is, however, modified so that rather than forming a web, fiber balls are formed. In this regard, reference is made to FIG. 3 where like parts to that previously described are similarly numbered but designated with a prime. The nub or fiber ball making device 10' includes a main cylinder 12', which rotates in a clockwise fashion. The clothing 14' is in the same direction as used in carding. The lickerin roll 16' and feed rolls 20' operate in the same manner as previously described. They serve, however, to feed micro denier (e.g. 1 denier or less in size) random staple fibers 22' made from polyester. Note, the fiber may also be siliconized to improve the feel of the ultimate product. The stripper rolls 24' operate the same as previously discussed. However, the worker rolls 26', rotating in the reverse of that previously discussed with the clothing thereon also reversed. The fancy roll 28' operates the same with, however, the doffer roll 30' operating in the reverse with the clothing thereon also reversed.

Figure 3:
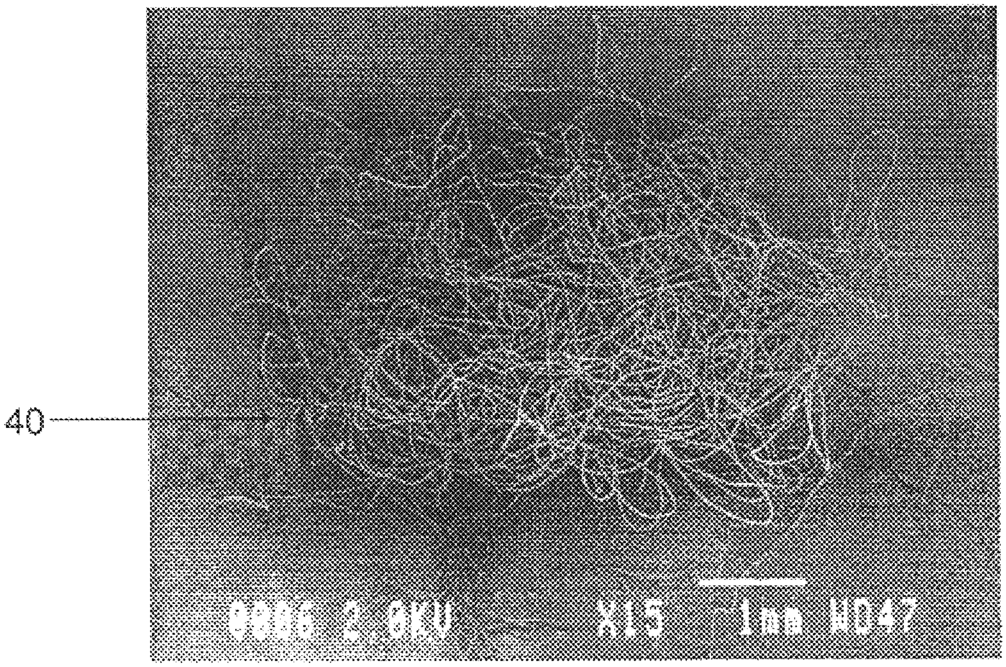
FIG. 3 illustrates a fiber ball, incorporating the teachings of the present invention.
Figure 4:
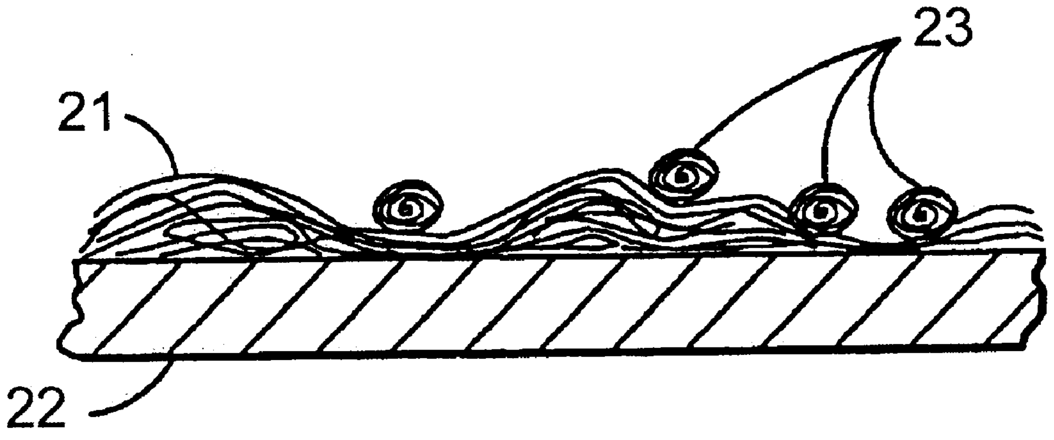
FIG. 4 illustrates representationally a fiber ball being formed, incorporating the teachings of the present invention.

The purpose of device 10' is to create a fiber ball 40 as shown in FIG. 3 out of micro denier polyester staple fibers. Such fibers provide for a superior insulation effect and may be blended with other natural fibers such as cotton, wool, silk, down or synthetic fibers. Through the use of the device 10', the fiber balls 40 are formed out of a number of micro denier fibers, which are essentially rolled and entangled together into a ball (see FIG. 4) by the interaction of the worker rolls 26', stripper rolls 24' and main cylinder 12' and are ultimately removed by the doffer roll 30'.

Note that the device 10' is merely illustrative of one way in which the fiber balls of the present invention may be formed. Other devices suitable for the purpose may also be utilized.

Although a preferred embodiment has been disclosed and described in detail herein, its scope should not be limited thereby; rather its scope should be determined by that of the appended claims.

What is claimed is:

1. An insulation or filling material comprising a substantially round random entanglement of fibers which forms a fiber ball comprising micro denier fibers which are uncrimped and not bonded together.

2. The invention in accordance with claim 1 wherein all of the fibers which make up the fiber ball are micro denier fibers.

3. The invention in accordance with claim 2 wherein said micro denier fibers are made of polyester.

4. The invention in accordance with claim 1 wherein said micro denier fibers are made of polyester.

5. The invention in accordance with claim 1 wherein said insulation or filling material includes said fiber balls in an admixture with natural fibers or synthetic fibers.

6. The invention in accordance with claim 3 wherein said insulation or filling material includes said fiber balls in an admixture with natural fibers or synthetic fibers.

7. The invention in accordance with claim 4 wherein said insulation or filling material includes said fiber balls in an admixture with natural fibers or synthetic fibers.

8. The invention in accordance with claim 1 wherein said fibers are siliconized.

* * * * *